US007147830B2

(12) United States Patent
Hero et al.

(10) Patent No.: US 7,147,830 B2
(45) Date of Patent: *Dec. 12, 2006

(54) STABILIZED AMMONIUM NITRATE GRANULES

(75) Inventors: Heikki Hero, Espoo (FI); Juhani Poukari, Masala (FI)

(73) Assignee: Kemira Growhow Oyj, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/206,875

(22) Filed: Aug. 19, 2005

(65) Prior Publication Data

US 2005/0276740 A1 Dec. 15, 2005

Related U.S. Application Data

(62) Division of application No. 10/169,024, filed as application No. PCT/FI01/00011 on Jan. 4, 2001, now Pat. No. 7,014,828.

(30) Foreign Application Priority Data

Jan. 4, 2000 (FI) ................... 20000013

(51) Int. Cl.
C01C 1/18 (2006.01)

(52) U.S. Cl. .................................... 423/396

(58) Field of Classification Search ............... 423/395, 423/396
See application file for complete search history.

(56) References Cited

U.S. PATENT DOCUMENTS

| | | | |
|---|---|---|---|
| 2,407,151 A | 9/1946 | Glogau |
| 3,199,950 A | 8/1965 | Austin |
| 3,212,944 A | 10/1965 | Lyon et al. |
| 3,223,478 A | 12/1965 | Wilson |
| 3,230,038 A | 1/1966 | Wilson |
| 3,379,496 A | 4/1968 | Russo |
| 3,639,643 A | 2/1972 | Mollerstedt et al. |
| 3,649,173 A | 3/1972 | Falck-Muss et al. |
| 4,359,505 A | 11/1982 | Joedicke |
| 4,408,998 A | 10/1983 | Mutsers et al. |
| 4,486,396 A | 12/1984 | Kjohl et al. |
| 4,552,736 A | 11/1985 | Mishra |
| 5,063,036 A | 11/1991 | Engel et al. |
| 5,071,630 A | 12/1991 | Oberth |
| 5,098,683 A | 3/1992 | Mehrotra et al. |
| 5,292,387 A | 3/1994 | Highsmith et al. |
| 5,720,794 A | 2/1998 | Tortorelli |
| 6,365,120 B1 | 4/2002 | Granquist et al. |
| 6,372,191 B1 | 4/2002 | Mendenhall et al. |

FOREIGN PATENT DOCUMENTS

| | | |
|---|---|---|
| GB | 1174811 | 12/1969 |
| GB | 1189448 | 4/1970 |
| WO | WO-97/29061 A1 | 8/1997 |

OTHER PUBLICATIONS

Liisa Makela, Abstract of Master's Thesis, Helsinki University of Technology, "The properties of phlogopite as fertilizer raw material", Nov. 9, 1998.
Chinese Office Action dated Nov. 21, 2003, and English-language translation thereof.

*Primary Examiner*—Wayne A. Langel
(74) *Attorney, Agent, or Firm*—Birch, Stewart, Kolasch & Birch, LLP

(57) ABSTRACT

The invention relates to a method for producing thermally and mechanically stable ammonium nitrate by dissolving in nitric acid 1–3% by weight of reticulated metal silicate, before treatment with ammonia. The ammonium nitrate granules produced by this method swell very little, they do not considerably cake, and their granule strength is high.

5 Claims, No Drawings

STABILIZED AMMONIUM NITRATE GRANULES

This application is a divisional of application Ser. No. 10/169,024, which was filed on Sep. 26, 2002 now U.S. Pat. No. 7,014,828. Ser. No. 10/169,024 is the national phase under 35 U.S.C. §371 of PCT International Application No. PCT/FI01/00011, which has an International filing date of Jan. 4, 2001, and which designated the Unites States of America. This application claims priority under 35 U.S.C. §120 to Ser. No. 10/169,024 and to PCT/FI01/00011. This application claims priority under 35 U.S.C. §119 to Finnish patent application 20000013, which was filed on Jan. 4, 2000. The disclosures of the above-mentioned Finnish priority application, PCT application, and prior U.S. application are expressly incorporated by reference herein.

This invention relates to a method for producing thermally and mechanically stable ammonium nitrate by using as stabilizing substance a reticulated silicate belonging to the group of micaceous minerals. In addition, the invention relates to stable ammonium nitrate produced according to this method.

Ammonium nitrate is typically produced by neutralizing nitric acid with ammonia. The product thus produced is mainly used either directly as such or as a mechanically blended mixture component to produce high quality nitrogenous fertilizers or mixed fertilizers. Generally, from a commercially significant, pure ammonium nitrate is required that its nitrogen content must be more than 33.5% (theoretical maximum 35%) whereby it may typically contain about 4% of impurities such as stabilizing matter and some water. Ammonium nitrate is also an efficient oxidizing agent, hence its use in explosives industry.

Characteristic of ammonium nitrate are changes in the volume of the material that are due to changes in crystalline form occuring at various temperatures. The most problematic is the irreversible swelling taking place in typical applications of the compound, at a temperature range of 32° C., which is by one thermal cycle, for example 25° C.→50° C., 3.6%. Especially, if the temperature is cycled several times at the range in question over the point of change the problem is accentuated. The ammonium nitrate granules begin to dissociate into small parts and are little by little changed into dust-like particles. In an industrial scale the quality of the material easily deteriorates during transport and during long-time storage whereby even due to its hygroscopicity caking occurs. In addition, the premises must repeatedly be cleansed of dust which may occasionally even lead to closing of the plant.

In use as a fertilizer swelling is accompanied by breaking and disintegrating of the fertilizer granules, tearing of the sacks and exposing of the compound to the humidity of the outdoors air.

Attempts have been made already for a long time to improve the properties of ammonium nitrate granules by blending in the material various additives. These stabilizers may be added to reactions in the solid phase or directly in the ammonium nitrate melt whereby with the aid thereof for example mechanical properties or resistance to humidity have successfully been changed. Stabilizers used are for example $CaSO_4$, $H_3PO_3+(NH_4)_2HPO_4+(NH_4)_2SO_4$, ammonium polyphosphate and potassium polyphosphate, silica gel, metal oxides, kaoline, $Mg(NO_3)_2$ and $Al_2(SO_4)_3$, potassium nitrate, potassium fluoride, salts of a metal dinitramide, zinc oxide, magnesia, nickel oxide, salts of certain metals, such as Li, Ca, Ba and Al, urea, ethylene diamine dinitrate, diethylene triamine trinitrate, guanidium nitrate and melamine. As compounds functioning as crystallization centers clay, talc, silicates and natural siliceous materials have been used. However, none of these alternatives has proven to be in all of its aspects a fully satisfactory solution for stabilizing ammonium nitrate. Problems have been caused by for example poor resistance to humidity ($Mg(NO_3)_2$), mechanical strength of the granules (talc), dangerous nature of the production process (KF), decrease of the transition temperature, the large amounts of additives needed and economical factors, such as a competitive price by large production quantities.

The stability of ammonium nitrate has been improved according to GB Patent 1,189,448 by blending in ammonium nitrate melt 0.1–10% finely divided clay material, kaoline, attapulgite, talc, montmorillonite or their mixture and by granulating the melt thus obtained. In addition to clay-like materials even compounds forming hydrates, such as aluminium oxide, aluminium sulfate, magnesia, magnesium carbonate or magnesium nitrate may be added to the melt. Problems are caused by dusting of the clay-like materials used which is due to their extremely small particle size (<75 μm), and for example, by the high price of attapulgite.

The most common micaceous minerals encountered in nature are muscovite $KAl_2(AlSi_3O_{10})(OH)_2$, phlogopite $KMg_3(AlSi_3O_{10})(OH,F)_2$ and biotite $K(Mg,Fe)_3(Al,Fe)Si_3O_{10}(OH,F)_2$. The internal classification of these is based on the amount of iron, aluminium and magnesium in the structure. Phlogopite and biotite form a continuous series, if Mg:Fe>2, the mineral is phlogopite, and if Mg:Fe<2, the mineral is biotite. The micaceous materials are encountered in nature as squamous and plate micas. The electric industry is the largest comsumer of plate micas, this being due to their good insulating properties, endurance and flexibility. Mica materials are chemically inert. Squamous mica is used to produce mica paper and as filling material in for example plastics, cement, paints and rubber. Untreated phlogopite may be used even as a soil improving substance, especially as source for slowly solubilizing kalium. The phlogopite obtained as by-product in enriching apatite may contain as impurity for example calcite or dolomite.

The properties of phlogopite in use as a fertilizer has been studied in the thesis of Liisa Mäkelä(Helsinki University of Technology 1998: "Properties of phlogopite as raw material for a fertilizer"). In the experimental section it was found that phlogopite is changed in acid treatment to a vermiculite-type of mineral that has an extremely good water binding ability. The acid treated phlogopite can bind water to ⅔ of its own weight which explains the good resistance to humidity observed with fertilizers containing phlogopite.

In Kemira Patent FI 100,102 there is presented, how the properties, strength and stability of fertilizer granules may be improved by using phlogopite as raw material. The method allows for the sparingly soluble potassium and magnesium of phlogopite to be rendered in soluble form in order to be utilized as fertilizer. The fertilizer granules thus produced can withstand transport and storage as well as changes of temperature without dissociating or caking or forming dust. In the formulation according to this method the amount of phlogopite needed was large, 100–300 kg per ton of fertilizer.

Surprisingly it has been found that thermally and mechanically stable ammonium nitrate can be made in such a way that a minor amount of reticulated silicate, such as phlogopite, is added to the production process of ammonium nitrate. This decreased essentially the swelling of ammonium nitrate found problematic, and improved the physical properties of the product.

The purpose of the invention is to provide ammonium nitrate which is mechanically and thermally stable enough.

According to this invention in a first stage a minor amount, for example 10–30 kg of reticulated silicate, preferably biotite, phiogopite or a mixture thereof, is dissolved in 760–770 kg of concentrated 100% nitric acid that is essentially pure nitric acid or may contain minor amounts of other compounds, preferably for example 10–15 kg of concentrated sulfuric acid. This results in the exothermic dissolution of reticulated silicate minerals. The temperature of the reaction mixture is maintained in the range of 40–70° C., preferably in the range of 50–70° C. If the temperature is allowed to rise to too high a value, this leads to formation of toxic $NO_x$ gases. In addition, metal compounds contained in the reticulated silicate are selectively soluble as a function of temperature; at higher temperatures, undesired iron and aluminium compounds start to dissolve.

In a second stage this reaction mixture produced above that contains minor amounts of insoluble residual matter is treated with gaseous ammonia to nearly a neutral value. If the pH value remains too low, the ammonium nitrate produced starts to dissociate and on the other hand, is the pH value is adjusted to too high a level the ammonia emission increases. The pH of the mixture is preferably adjusted to a value of 5.0–7.0. The amount of ammonia needed is 200–205 kg/ton. The treatment with ammonia may be accomplished either at atmospheric pressures or at an increased pressure. During ammonia treatment, the temperature of the mixture is forced to a range of 110–170° C., preferably 110–150° C. If the temperature rises to too high a value, ammonium nitrate starts to dissociate. This provides a slurry.

In a third stage the slurry provided above is granulated for example in a drum, blunger, prilling tower or fluidized bed. After this, the product obtained is dried using traditional equipment for producing fertilizers, for example in a drying drum. The product granules are cooled down and coated for example with coating oil or powder, such as talc.

The ammonium nitrate produced according to the inventive method is pure enough, for example fertilizer grade, whereby its nitrogen content is in the range of 32–34.5%, preferably 33–34%. Typical impurities are, when for example phlogopite is used, minor amounts of soluble potassium and magnesium which also act as fertilizers if need may be, as well as water.

The added sulfuric acid binds magnesium, and possibly calcium, brought over by the reticulated silicate, such as phlogopite, into sulfate salts. Without the addition of sulfuric acid these metals would exist as their nitrate salts whereby they would contribute to the hygroscopicity of the product being formed.

The reticulated silicate used in the method according to the invention need not be fully pure. For example, the phlogopite obtained as by-product of the enrichment process may contain other minerals such as 20% of calcite and 10% of dolomite.

Properties reflecting the thermal and mechanical stability of the ammonium nitrate according to the invention may be tested with the aid of various typical measuring methods. The most important of these are:

Swelling, which reflects the change in volume that ammonium nitrate undergoes due to a change in crystal form at 32° C., this being due to repeated increases and decreases of temperature. The ammonium nitrate produced by the method according to this invention is characterized in that swelling is very limited, typically only 0–2%.

Adsorption of oil, which reflects the tendency of ammonium nitrate granules to absorb onto them oil, this characterizing the potential explosive tendencies of the material. The ammonium nitrate produced by the method according to this invention is characterized in that the adsorption of oil is very low, typically only about 4%.

Caking, by which is meant clinging together of the ammonium nitrate granules, whereby the product ceases to be freely flowing. The ammonium nitrate produced by the method according to this invention is characterized in that caking is low, under 1%, if enough reticulated silicate has been added, 20 kg per ton, and the product is coated.

Granule strength, which reflects the ability of the granules to withstand static charging, for example during storage and transport. The ammonium nitrate produced by the method according to this invention is characterized in that the granule strength is high, more than 30 N, if the amount of reticulated silicate added is 15 kg per ton or more.

In addition, the behavior of the granules in various circumstances may be predicted, if, for example, the relative critical humidity, absorption of humidity, porosity and volumetric weight of the material are known. Adding reticulated silicate decreases the porosity of ammonium nitrate, increasing at the same time the volumetric weight. The structure, as it were, becomes tighter.

Adding reticulated silicate according to the method described in this invention to the production process of ammonium nitrate is technically very simple. In addition, reticulated silicate, such as phlogopite, is markedly lucrative as to the material costs, compared to other materials used as stabilizers.

The invention is illustrated in the following with the aid of comparative examples and performance examples without limiting therewith the scope of the invention.

EXAMPLE 1

Ammonium nitrate was produced by treating with ammonia 762 kg (100%) nitric acid at 110° C., until the pH was about 6.5. Thereafter, 30 kg of dolomite were added in the solution. The slurry produced was granulated and the granules obtained were dried and cooled down.

EXAMPLE 2

Ammonium nitrate stabilized by phlogopite was produced by dissolving 10 kg of phlogopite that had been obtained as enrichment waste from the Siilinjärvi apatite mine, in 762 kg (100%) of nitric acid at the temperature of 50° C. for half an hour. The solution was treated with ammonia at 110° C., until the pH was about 6.5. Thereafter, 20 kg of dolomite were added in the solution. The slurry produced was granulated and the granules obtained were dried and cooled down.

EXAMPLE 3

Ammonium nitrate stabilized by phlogopite was prodeced as described in example 2, but 20 kg of phlogopite and 10 kg of dolomite were used.

EXAMPLE 4

Ammonium nitrate stabilized by phlogopite was prodeced as described in example 2, but 30 kg of phlogopite were used and the addition of dolomite was omitted.

EXAMPLE 5

Ammonium nitrate stabilized by phlogopite was produced by dissolving 20 kg of phlogopite in 762 kg (100%) of nitric acid and in 10 kg of concentrated sulfuric acid at the temperature of 50° C. for half an hour. The solution was treated with ammonia at 110° C., until the pH was about 6.5. The slurry produced was dried, granulated, dried and cooled down as well as coated with 1.5 kg per ton of a NESTE oil and with 2 kg per ton talc.

EXAMPLE 6

On the basis of structural analysis by X-ray diffraction of the ammonium nitrate granules produced according to examples 1–5, their Karl Fischer titration and contents of $NH_4$ and NO nitrogen determined by autoanalyzer it could be seen that the total nitrogen content of the granules was in the range of 32.8–33.6, and the amount of water was 0.74–1.5%. The amount of water increased 0.74→1.2→1.5%, when the proportion of phlogopite in the production process increased 10→20→30 kg/t, this being a good indication of the fact that by adding phlogopite a better resistance to water is provided. In all cases the compound created was for the most part of the (IV) phase, but contained, however, minor amounts, under 4%, of the (III) phase. As impurities small amounts of calcite and dolomite werer detected.

EXAMPLE 7

The caking properties of the ammonium nitrate granules produced according to examples 1–5 were tested by maintaining micro-sacks of 100 ml for 24 hours in a pressure device at the pressure of 2.1 bar, whereafter the sacks were dropped through a 480 mm dropping tower onto a hard plane. After this, the contents of the bags were sieved on a 7.1 mm sieve, and cakes remaining on top of the sieve were weighted. Caking is disclosed as the percentage of the sample remaining on the sieve form its total weight. Oven humidity was determined by keeping an ammonium nitrate sample in a heating oven at 105° C. for 4 hours and measuring thereafter the change in weight after drying.

TABLE 1

|  | Ex. 1 | Ex. 2 | Ex. 3 | Ex. 4 | Ex. 5 |
| --- | --- | --- | --- | --- | --- |
| Caking (%) | 23 | 39 | 30 | 7.2 | 0.3 |
| Oven humidity (%) | 0.7 | 0.5 | 1.2 | 1.4 | 1.0 |

From the data presented in Table 1 the beneficial effect of the phlogopite addition in order to decrease caking may be clearly seen. Caking is essentially decreased when enough phlogopite has been added, 30 kg per ton, as in example 4, although lots of humidity have been bound into the structure. Adding sulfuric acid lessens absorption of humidity, and together with a coating decreases caking even further, caking being in the product according to example 5 especially low, only 0.3%.

EXAMPLE 8

Swelling of the ammonium nitrate granules produced according to examples 1–5 was measured by storing the granules in turn at 25° C. and at 50° C. The change in volume of the granules poured into a measuring glass was determined by cycling the temperature 5 times between these two different conditions, 2 h/50° C./25% RH and 2 h/25° C./50% RH. Swelling is indicated as percentual change in volume in relation to the starting situation.

According to the data presented in Table 2 even a slight addition of phlogopite, 10 kg per ton in example 2, in the production process of ammonium nitrate decreases swelling essentially, and when the amount added is high enough (20–30 kg/t), swelling is almost non-existent. The effect of phlogopite in decreasing swelling is clearly seen even in the case, where in the production process minor amounts (10% by weight) of sulfuric acid have been added.

TABLE 2

|  | Ex. 1 | Ex. 2 | Ex. 3 | Ex. 4 | Ex. 5 |
| --- | --- | --- | --- | --- | --- |
| Swelling (%) | 8 | 4 | 0 | 0 | 2 |

EXAMPLE 9

Absorption of oil into the ammonium nitrate granules produced according to examples 1–5 was tested by sinking a granule sample in domestic heating oil (Neste Oy, viscosity: 5 mPa.s, 40° C.; density 0.85 g/ml, 20° C.). The granules were left to stand in the oil for one hour whereafter excess oil was removed from the surface of the granules and the granules were weighted. Percentual absorption of oil was calculated from the change in the mass of the sample granules in relation to the initial mass of the sample.

Porosity was determined by placing the granule samples in a cuvette in vacuum whereafter the cuvette was filled with quick silver which was pressed into the pores of the samples with the aid of a pressure of one bar. The quick silver's surface in the cuvette lowered as the quick silver penetrated the sample pores. By measuring the capacitance of the cuvette's shielding tube the pore volume of the sample could be determined.

Volumetric weight was determined by weighting the mass of the sample that flowed freely from an adding funnel that was at a height of 440 mm from the beaker's bottom, into an one liter beaker.

According to the data presented in Table 3 the volumetric weight of the granules increases as the amount of phlogopite added to the production process increases, at the same time, the porosity of the granules decreases. This is seen even in the granules' tendency to adsorb oil which is considerably decreased when phlogopite is used in the production process.

TABLE 3

|  | Ex. 1 | Ex. 2 | Ex. 3 | Ex. 4 | Ex. 5 |
| --- | --- | --- | --- | --- | --- |
| Porosity (%) | 0.177 | 0.108 | 0.094 | 0.111 | 0.102 |
| Volumetric weight (kg/l) | 0.71 | 0.73 | 0.81 | 0.81 | 0.82 |
| Adsorption of oil (%) | 18 | 15 | 4.4 | 3.9 | 3.9 |

EXAMPLE 10

The granule strenght of the ammonium nitrate granules produced according to examples 1–5 was determined as a mean by breaking 30 granules with pressure in a pressure device that was equipped with a dynamometer.

According to the data presented in Table 4 even a slight addition of phlogopite improves the granule strength. If ammonium nitrate granules are produced by adding at the production stage both phlogopite and sulfuric acid, as is the case in example 5, the granule strength is markedly improved.

TABLE 4

|  | Ex. 1 | Ex. 2 | Ex. 3 | Ex. 4 | Ex. 5 |
|---|---|---|---|---|---|
| Granule strength (N) | 16 | 17 | 30 | 31 | 41 |

EXAMPLE 11

The effect of humidity on the quality of the ammonium nitrate granules produced according to examples 1–5 was investigated by measuring the critical relative humidity (CRH) of the granules at 20° C., as well as the change in weight caused by the absorption of humidity when the granule samples were maintained at 80% RH and at 22° C. for 2, 4 or 6 hours.

TABLE 5

|  | Ex. 1 | Ex. 2 | Ex. 3 | Ex. 4 | Ex. 5 |
|---|---|---|---|---|---|
| CRH (%) | 35 | 30 | 16 | 12 | 22 |
| Absorption of humidity(%): |  |  |  |  |  |
| 2 hours | 1.9 | 2.4 | 3.0 | 3.1 | 1.6 |
| 4 hours | 3.8 | 4.3 | 5.2 | 5.4 | 3.5 |
| 6 hours | 5.6 | 6.0 | 7.2 | 7.5 | 5.0 |

From the Table 5 it may be seen that when added alone to the production process, phlogopite has a tendency to weaken the product's resistance to humidity, but if as an auxiliary substance a small amount of sulfuric acid is added, the proportion of interfering, hygroscopic Mg and Ca salts may be diminished whereby even the resistance to humidity is improved.

EXAMPLE 12

For the ammonium nitrate granules produced according to examples 1–5 magnesium nitrate and calcium nitrate contents were determined, and they are presented in Table 6. Adding sulfuric acid was found to considerably decrease the amount of remaining hygroscopic $Mg(NO_3)_2$ and $Ca(NO_3)_2$.

TABLE 6

|  | Ex. 1 | Ex. 2 | Ex. 3 | Ex. 4 | Ex. 5 |
|---|---|---|---|---|---|
| $Mg(NO_3)_2$ (%) | 0.03 | 0.56 | 1.4 | 2.4 | 0.69 |
| $Ca(NO_3)_2$ (%) | 0.53 | 0.97 | 0.56 | 0.03 | 0.03 |

What is claimed is:

1. A method for producing thermally and mechanically stable, granulated ammonium nitrate, which method comprises the steps of:
    a) dissolving reticulated metal silicate, selected from the group consisting of biotite, phlogopite, and mixtures thereof, in an amount of 1–3% by weight of the ammonium nitrate product in pure nitric acid or in nitric acid containing 1–2% by weight of concentrated sulfuric acid to form a reaction mixture of nitric acid and reticulated metal silicate,
    b) treating the reaction mixture of nitric acid and reticulated metal silicate with ammonia in order to form an ammonium nitrate slurry, and in order to neutralize the solution,
    c) granulating the ammonium nitrate slurry, and
    d) drying the ammonium nitrate granules.

2. A thermally and mechanically stable granulated ammonium nitrate product of the method according to claim 1.

3. The thermally and mechanically stable granulated ammonium nitrate of claim 2, having a total nitrogen content in the range of 32–34.5%.

4. The thermally and mechanically stable granulated ammonium nitrate of claim 3, having a total nitrogen content in the range of 33–34%.

5. The thermally and mechanically stable granulated ammonium nitrate of claim 2, wherein the reticulated metal silicate is phlogopite.

* * * * *